United States Patent [19]

Konikoff et al.

[11] 4,340,929
[45] Jul. 20, 1982

[54] ILLUMINATED PORTABLE FLOOR

[75] Inventors: Robert S. K. Konikoff, North Miami Beach; Richard G. Rudolph, Miami; George H. Gill, North Miami, all of Fla.

[73] Assignee: Sico Incorporated, Minneapolis, Minn.

[21] Appl. No.: 101,716

[22] Filed: Dec. 10, 1979

[51] Int. Cl.³ .................................................. F21S 1/02
[52] U.S. Cl. .................................... 362/153; 362/224; 362/800; 362/811; 52/592; 52/127.7
[58] Field of Search ............... 362/153, 224, 811, 800; 52/127, 592, 811

[56]  References Cited

U.S. PATENT DOCUMENTS 2,457,619 12/1948 Yocum ................................. 362/153
3,310,919 3/1967 Bue ......................................... 52/127

FOREIGN PATENT DOCUMENTS 24038 of 1894 United Kingdom ................ 362/153

Primary Examiner—Donald P. Walsh

Attorney, Agent, or Firm—Merchant, Gould, Smith, Edell, Welter & Schmidt

[57] ABSTRACT

An illuminated, portable floor comprising a plurality of releasably, lockable panels having an array of illuminable members disposed in a desired design pattern in the upper surface of each panel, male and female mechanical coupling members disposed around the periphery of each panel for mechanically locking the panels in a side-by-side contiguous relationship, electrical male and female connectors mounted within selected locations along said mechanical coupling members of particular panels for electrically connecting the illuminable members of selected adjacent panels, a low voltage electrical power source, and an electrical circuit network connecting the power supply, the electrical connectors, and the illuminable members together. As the floor is assembled, the joinder of side-by-side panel edges effects both mechanical and electrical coupling simultaneously. In one embodiment, square or rectangular panels are mechanically coupled together in columns and rows, while simultaneously electrically connected in either columns or rows. A distribution buss from the low voltage source provides power to each column or row.

5 Claims, 16 Drawing Figures

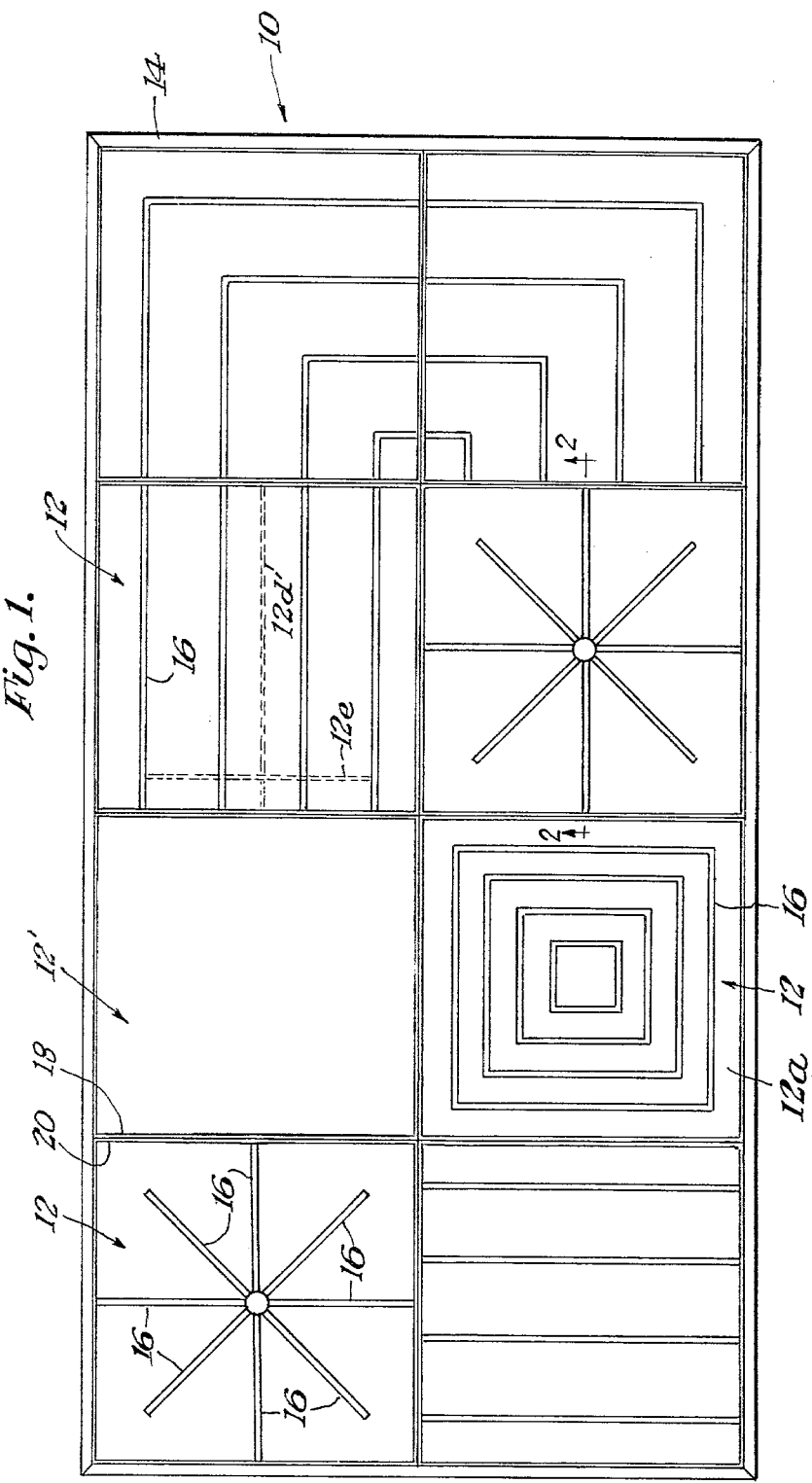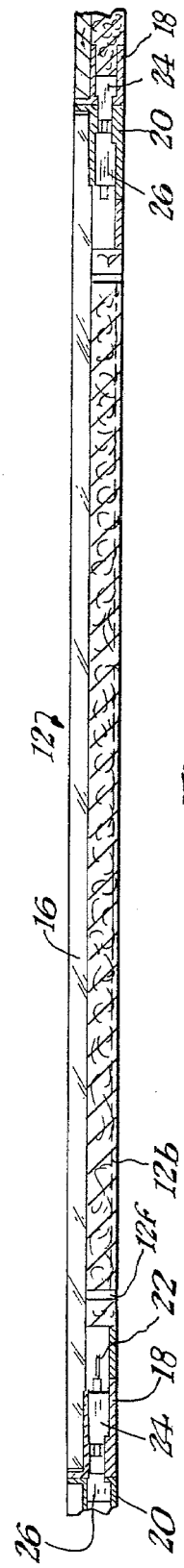

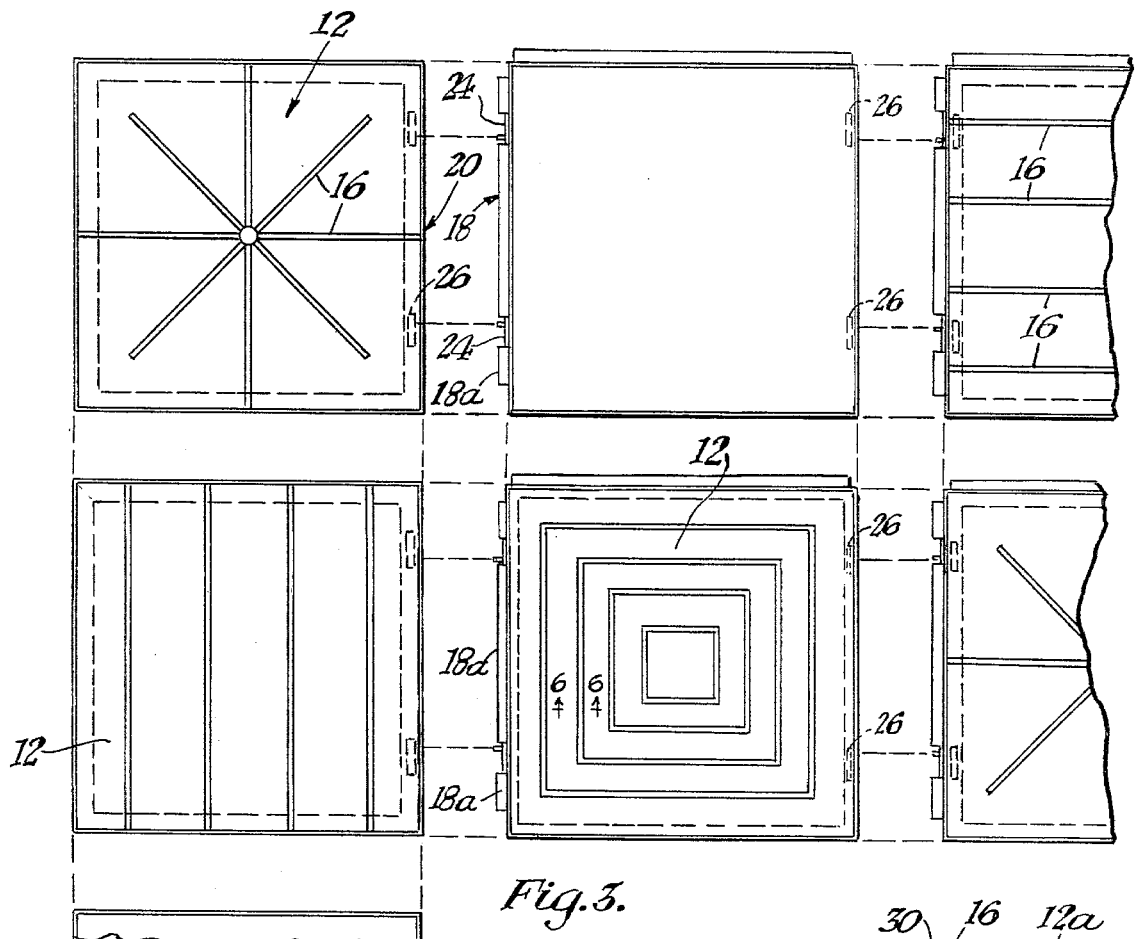
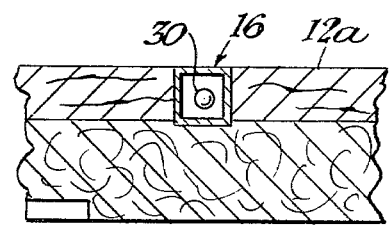
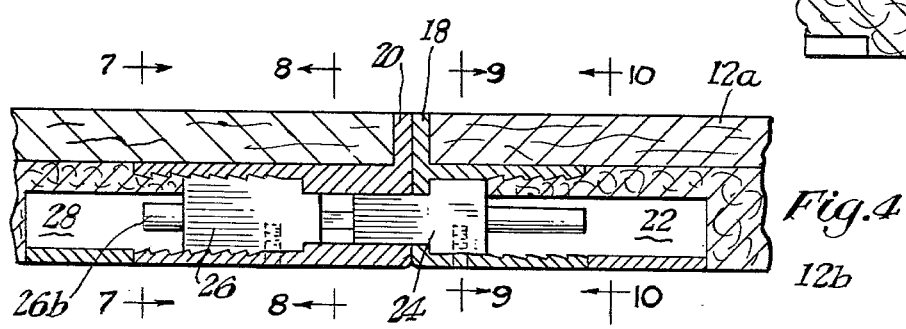
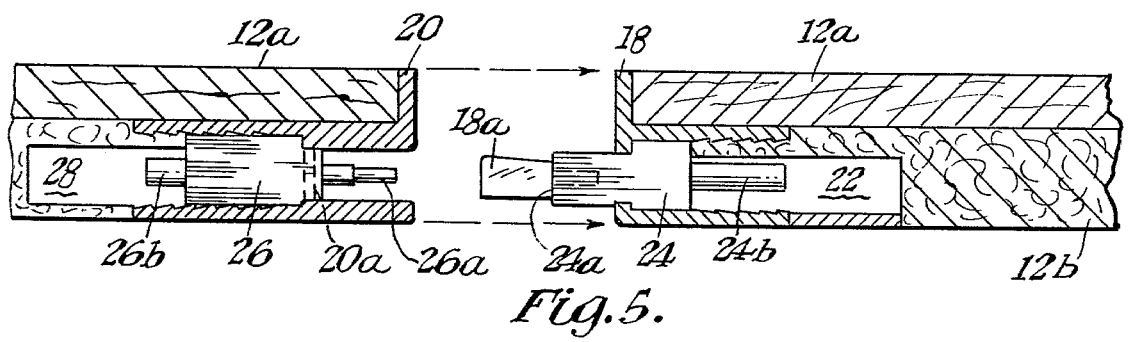

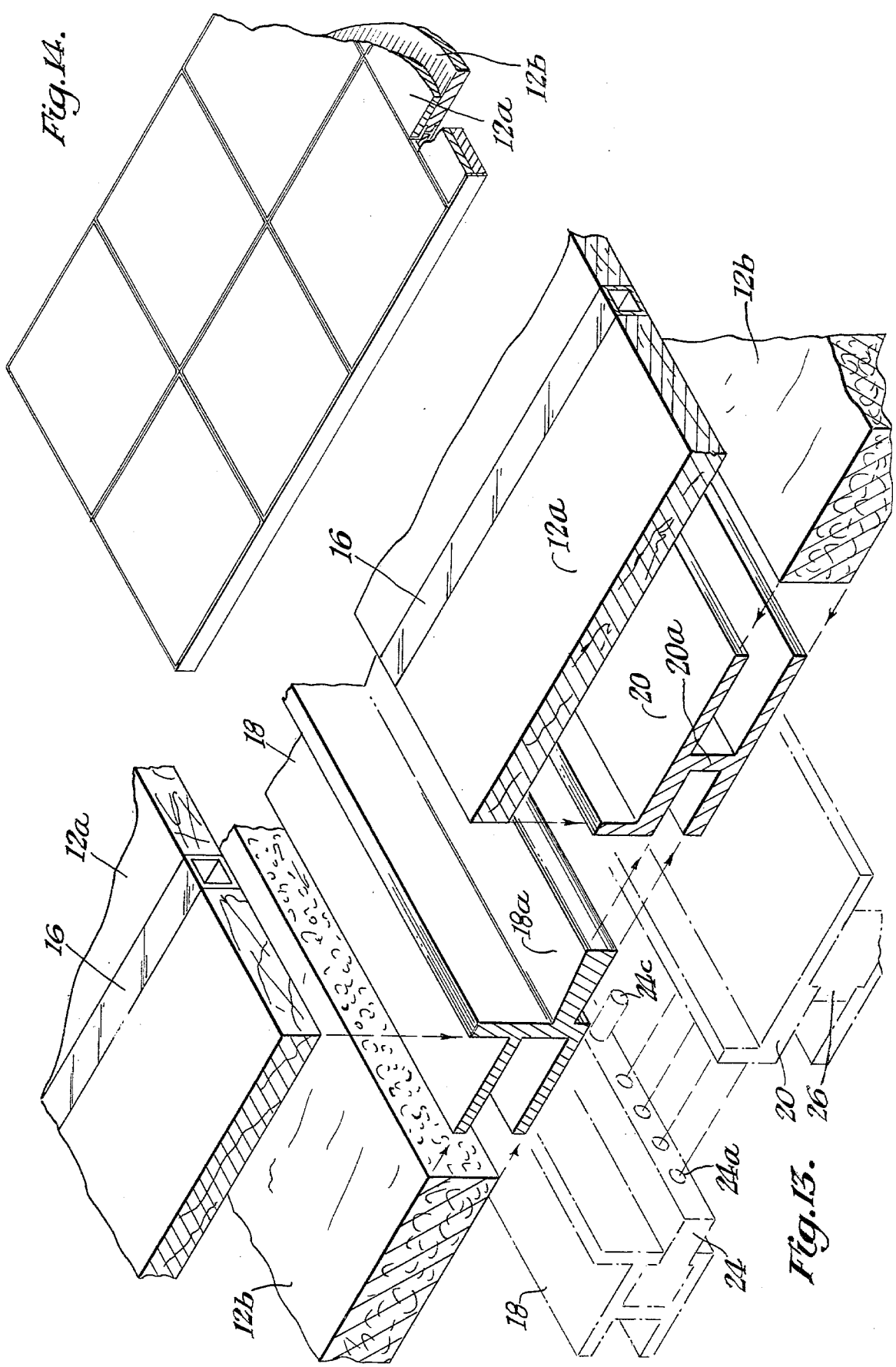

ILLUMINATED PORTABLE FLOOR

BACKGROUND OF THE INVENTION

This invention relates generally to a portable floor having surface lighting embedded therein, and specifically to a temporary, hard-surfaced illuminated floor made up from an array of panels having mechanical coupling members along all sides and electrical connectors end-to-end at preselected locations mounted with certain coupling members so that when the panels are mechanically assembled as a floor, an electrical network joining the illuminating elements is simultaneously accomplished.

Portable flooring has been used to provide a substantially flat, smooth, hard surface temporarily for dancing or various other activities. Such a floor is shown in U.S. Pat. No. 3,310,919 which includes a plurality of rigid panels joined together by mechanical coupling members that releasably lock the panels together.

Illuminated permanent flooring is known. In a permanent installation, the electrical network can be effectively integrated into the floor during construction to insure safe and hazard-free operation of the illuminated elements that can meet rigid electrical code requirements.

To safely illuminate a portable floor, such as the type described in U.S. Pat. No. 3,310,919, presents several problems. A safe but temporary electrical network to provide electrical power to all lighting elements is essential. The floor must be able to be quickly assembled or disassembled, by unskilled personnel, while withstanding weight and vibration when in use, without disruption of the mechanical couplings or the electrical network connections. The wiring must not interfere with the utility of the floor, nor must it require special electrical outlets for installation, except utilization of a low voltage source.

The present invention overcomes the problems associated in the illumination of a portable floor or any type of portable, joined panel array by providing an integrated mechanical coupling and electrical network that can be safely employed, and quickly assembled by unskilled personnel.

SUMMARY OF THE INVENTION

An illuminated portable floor comprised of a plurality of panels having mechanical coupling members along each edge for releasably locking adjacent panels together in a side-by-side contiguous array, one or more electrically actuated illumination strips, mounted in the upper surfaces of said panels, an electrical power supply, and an electrical circuit network connected to said illumination strips and said power supply.

In a first embodiment the electrical circuit network includes wiring disposed beneath the joined panels, the panels being supported slightly above the permanent supporting floor on narrow strips, forming wiring channels beneath the portable floor panels. Individual light strips on each panel are interconnected in rows or columns, with the interconnecting wiring being disposed in the circuit channels formed by the panel supports. Interconnected arrays may be connected to a common buss line to the single power source.

In an alternate embodiment, each panel in the floor array is constructed such that the electrical wiring for powering the light strips in the panel, the wiring for powering an adjacent panel, and electrical connectors for electrical connection to adjacent panels are integrated into each panel, for functional cooperation with the mechanical interlocking members. In this embodiment an entire illuminated portable floor can be installed or dismantled without concern for the electrical wiring among the light strips on the several panels. Such a prewired illuminable panel when mechanically coupled to a contiguous panel is simultaneously electrically connected.

Each panel in this embodiment includes an upper layer of a substantially hard material such as a hard wood and a base layer of a slab or sheet material such as fibre board that are suitably bonded together by an adhesive. Each panel may have one or more illuminating elements embedded in grooves in the upper layer. Blank interconnecting panels may be used having no light strips but with electrical connections for distribution of power through to adjacent panels. One such illuminating element might be a string of light bulbs of LED's disposed in rectangular or square translucent housing, hereinafter called a "light strip". The electrical wiring for each light strip eminates from one end of the translucent housing. One or more strips are inlaid in each panel.

Each panel also includes male and female mechanical coupling members disposed around its peripheral edges with electrical connectors (male and female) mounted integrally at selected locations through the mechanical coupling members, preferrably on two opposing parallel edges of each panel. Opposing electrical connectors in each panel are wired electrically together in parallel, the wiring being disposed in a suitably sized groove or channel disposed and hidden in the base layer extending from one end of the panel to another. In addition, the wiring from the light strips in the panel are connected to one of the opposing electrical connectors. A suitable channel or passage may be formed in the panel layers allowing the light strip wiring to be safely and integrally directed to terminals on the electrical connector, so that the finally formed panel has no loose or stray electrical wires hanging therefrom.

Using panels with a pair of electrical connectors each on opposite sides of each panel, a portable illuminating floor may be formed having electrical power distribution from panel to panel in either a column or row distribution pattern. In this configuration, each column (or row) would then be electrically interconnected along one side of the assembled floor by a buss linked to a single low voltage power source. The bus may be disposed and hidden beneath the peripheral edging strip of the floor. Thus, all of the light strips in the entire floor can be powered and controlled from a single wiring line eminating from an assembled floor to the power source. In essence the electrical network is formed as the panels are mechanically interlocked together during installation.

It is an object of this invention to provide a portable illuminated floor.

It is another object of this invention to provide a portable floor having electrically actuated, lightable strips disposed in the upper surface of the floor and an electrical circuit network to supply power to the lightable strips.

It is an object of this invention to provide an illumination system which can be used with a joinable array of rigid, planar surfaces.

It is another object of this invention to provide a portable, illuminated floor which is easily and quickly joined together or disassembled and which is non-complex in construction, the entire system using a common, single electrical power source.

But yet still another object of this invention is to provide an illuminated, portable dance floor that has safety of operation, and that can be assembled or disassembled by non-electrically skilled persons and which does not impede the assembly of a conventional portable floor.

And yet still another object of this invention is to provide a system of electrical connectors for use with matable panels to provide for electrical interconnection between the panels.

In accordance with these and other objects which will be apparent hereinafter, the instant invention will now be described with particular reference to the accompanying drawings.

BRIEF DESCRIPTION OF THE DRAWINGS

FIG. 1 shows a top plan view of a portable dance floor utilizing the present invention, with different illumination design patterns employed in different panels and one panel with no illumination.

FIG. 2 shows a side elevational view in cross-section through line 2—2 of FIG. 1 of one panel constructed in accordance with the present invention joined to fragmentary views of adjacent panels.

FIG. 3 shows a top plan view of a plurality of panels, exploded, which are utilized in the present invention.

FIG. 4 shows a fragmentary cross-sectional view of the electrical connector and associated mechanical coupling along the adjoining edges of two adjacent panels.

FIG. 5 shows the view of FIG. 4 with the adjacent panels separated.

FIG. 6 shows an elevational view in cross section along line 6—6 of FIG. 1 of the mounting of an illuminating element within the panel upper exposed surface.

FIG. 13 is a fragmentary, exploded perspective view of the panel coupling members and the panel electrical connectors mounted therein.

FIG. 14 shows a perspective cutaway view of the floor panels and mechanical coupling members.

PREFERRED EMBODIMENT

Figure 11:
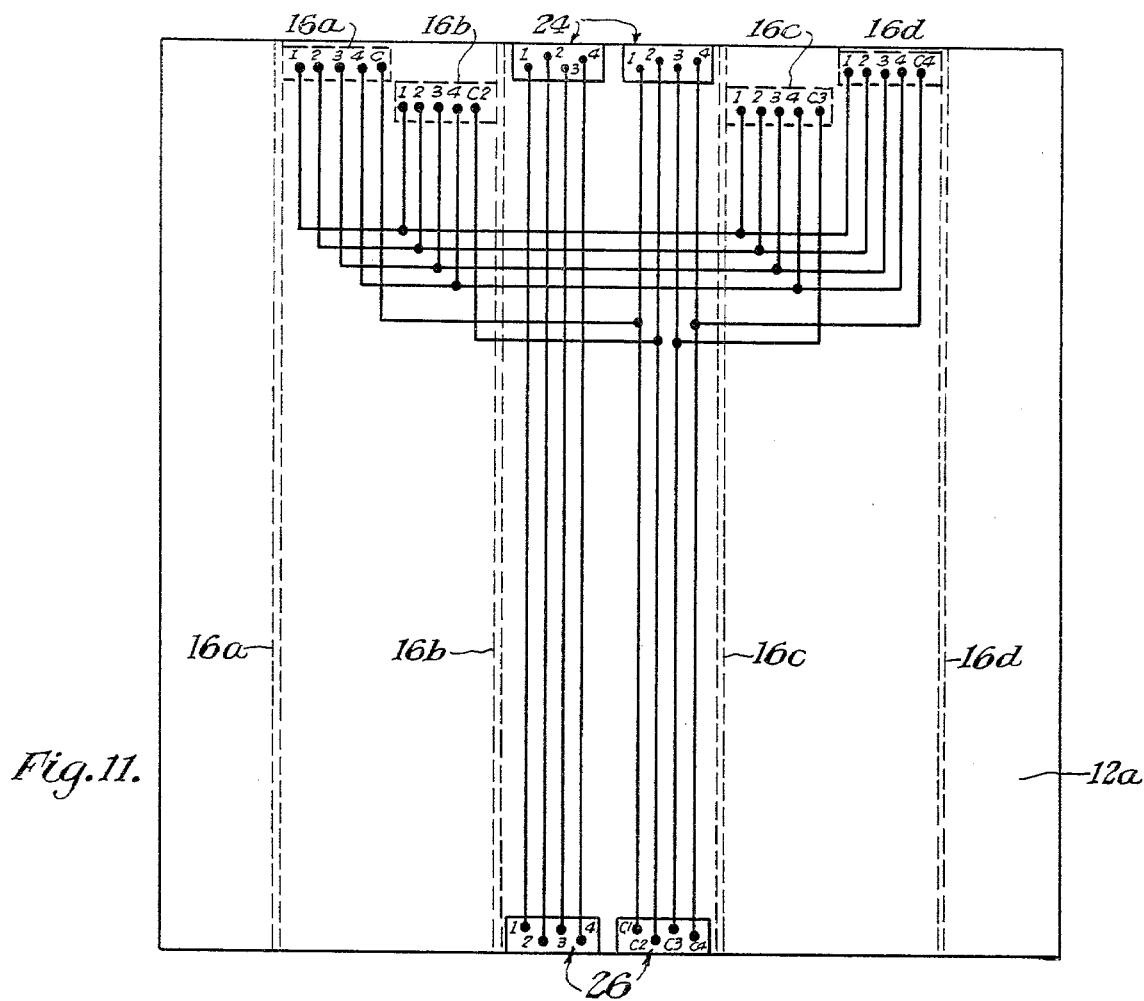
FIG. 11 shows a top plan view illustrating schematically the electrical circuitry utilized in a single panel in accordance with the present invention.

Referring now to the drawings and specifically FIG. 1, the present invention is shown generally at 10 which is essentially an eight-panel, portable floor made up of a plurality of panels 12, having illumination members 16 mounted therein in the upper surface, and for the sake of illustration, a conventional panel 12' is shown with no illumination members disposed therein. A conventional rigid border 14 is disposed around the eight panels drawn together. Each panel as shown (with the exception of panel 12') shows an array of illumination members 16 disposed in a different pattern employed and as practiced in the preferred embodiment, utilizing four separate illumination members per panel, which may be a matter of design choice and is not a limitation in the present invention. The floor panels and mechanical coupling members in the overall portable floor are constructed in accordance with the principles shown in U.S. Pat. No. 3,310,919, the description of which is incorporated herein.

The illuminating members are essentially light tubes which in this case are rectangular hollow tubes having electrical circuitry and lighting elements such as light bulbs or LED's wired together along inside. The plastic tubes are translucent or transparent to allow the emission of light therefore, and are sized for appropriate mounting in grooves disposed in the upper panel 12a of each floor panel. This is normally a hardwood type of covering that is mounted over a separate fibre board panel 12b disposed beneath. The illuminating tubes 16 are sized in accordance with the grooves disposed in the upper panel 12a to fit firmly therein and do not require adhesive, such as that shown in FIG. 2. Upper surface of the illumination tube 16 is flush with the upper panel 12a.

FIG. 2 also shows disposed at each end of the representative panel 12, the mechanical coupling members 18 and 20, which allow the panel 12 to be joined mechanically to adjacent panels at each end, in accordance with U.S. Pat. No. 3,310,919. Mounted at selected locations through each mechanical coupling member 18 and 20 are electrical connectors 24 and 26 which provide for simultaneous electrical connection of the illumination tubes between adjacent panels along a column, or row with the mechanical joining of the adjacent panels. For example, connector 26 represents a male plug which is mounted within mechanical coupling member 20 (through a portion of the wall thereof) which is coupled into a female electrical connecting plug 24 mounted through the mid-wall of male coupling member 18 disposed on an adjacent panel.

FIG. 3 shows an array of floor panels 12 including, as an example, panel 12' having no illumination member, the array being shown for joinder in a side-to-side relationship. As shown, the top row across is electrically connected so that electrical connectors 24 are mated with connectors 26. Although the mechanical connectors such as 18 and 20 shown along disposed around the total periphery of each panel so that the panels may be joined from all sides, the electrical connectors such as elements 24 and 26 are positioned on two opposing sides so that electrically side-by-side panels in a particular row will form a single electrical coupling. The mechanical connectors such as male coupling member 18 have cut out segments which allow the introduction of and mounting of the electrical connectors through the mechanical coupling members themselves. Each of the electrical connectors is wired electrically both to respective light tubes 16 disposed in a particular panel, and also from end to end of the panels to allow for connection through the panels along a particular row. The electrical distribution and connection is described in greater detail below.

FIGS. 4 and 5 show the electrical and mechanical couplings between two adjacent panel ends. The electrical connection is formed by having an electrical insulated block such as block 26 which includes conductive elements 26a which are a series of conductive probes connected through to contact points 26b, which are formed in each male coupling forming the male connector 26. The male connector is recessed and mounted between the top and bottom plates forming the mechanical connection 20. A chamber 28 is disposed behind the rear of the male connector 26 to allow for the wires from the respective electrical connections to be mounted and attached to contact points 26b along the rear of the electrical connector 26. In order to mount the electrical connector 26a an aperture must be formed along wall 20a in the interior wall structure of the mechanical connector 20.

With respect to FIGS. 4 and 5, the female connector 24 includes sockets 24a that receive conductive plugs 26a mounted on male connector 26. In addition, the mechanical coupling member 28 includes a male member which engages with mechanical member 20 along most of the coupling area. This portion is cut out and an aperture formed to allow the insertion into the mechanical coupling member 18 of each of the electrical connector blocks 24. Conductive contact points 24b which connect directly into passage 24a allow the wiring from the tubes to be connected within space 22. Panel ends (shown separated in FIG. 5 and joined in FIG. 4) include mechanical male and female elements coupled together so that when the panel ends are joined together side by side, the electrical connectors will also be joined forming electrical connections between adjacent panels (columns or rows) simultaneously with the mechanical connection discussed above.

FIG. 6 shows one of the representative light strips 16 which is mounted in a recess in the upper surface 12a used in the portable floor. A lighting element such as a bulb 30 is shown disposed within the chamber formed by the light tube 16. Note that the upper surface of the light tube 16 is flush with the upper surface of the floor 12a.

Figure 7:
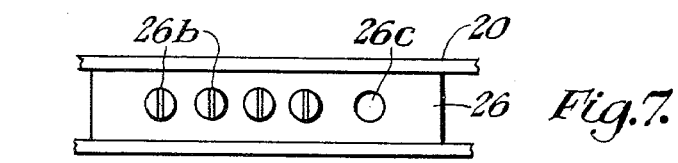
FIG. 7 shows a back elevational view of the male electrical connector along line 7—7 of FIG. 4 utilized in the present invention.
Figure 8:
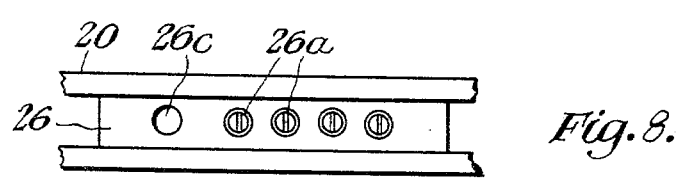
FIG. 8 shows a front elevational view of the male electrical connector along line 8—8 of FIG. 4.

FIGS. 7 and 8 shows back and front views of one of the male electrical connectors 25 which is mounted through the female mechanical connector 20 and which includes, as shown in FIG. 7, four terminals 26b which attach the electrical wiring system. The passage 26c is also shown in the body of the connector 26 which receives a stabilizing stud 24c mounted in the electrical connector 24 described below.

Figure 9:
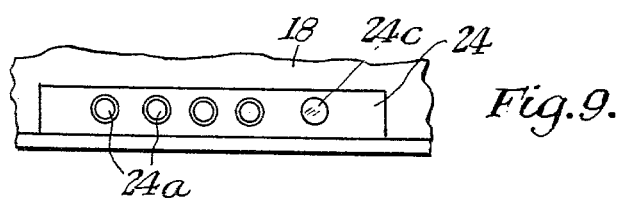
FIG. 9 shows a front elevational view of a female electrical connector along line 9—9 of FIG. 4 utilized in the present invention.
Figure 10:
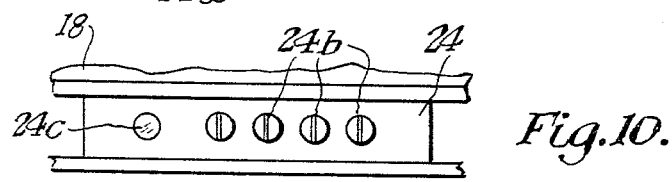
FIG. 10 shows a back elevational view of the female connector shown in FIG. 9 along the line 10—10 of FIG. 4.

FIGS. 9 and 10 show the female electrical connector 24 mounted through the lower mechanical connector which includes conductive sockets 24a spaced and sized to receive electrical plug 26a used in male electrical connector. A stabilizing stud 24c projects outwardly for stabilizing the electrical connection when male connector 26 is joined to female connector 24. FIG. 10 shows the terminal connection in which the electrical wiring is joined to the female connector 24.

Figure 12:
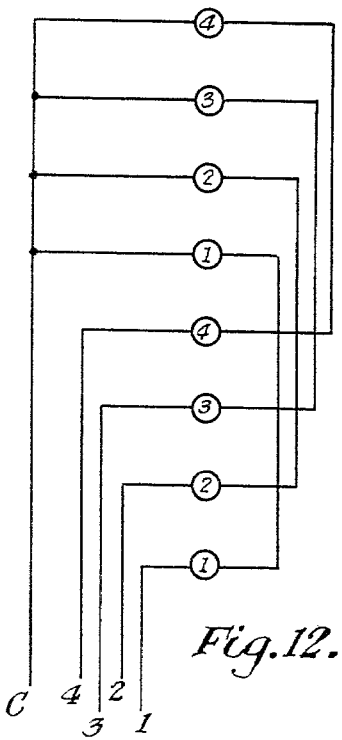
FIG. 12 shows a schematic diagram of the electrical circuitry utilized for a single illumination tube.

FIG. 11 shows a typical circuit diagram which is used to provide electrical contact to light tubes 16a, 16b, 16c and 16d which are parallely mounted in a single panel 12a. At the top end of the panel schematically represented is a female electrical connector 24 which comprise a pair of connectors. At the bottom end of the panel are a pair of male connectors 26 which are electrically connected together across contact points 1, 2, 3 and 4 and common contact points C1, C2, C3 and C4. Each light tube is connected and has four wires which as shown in FIG. 12 connect to terminals 1, 2, 3 and 4 at one end of the panel. Additionally each light tube has a common that is connected to different common points as shown. Thus, the circuit diagram as shown provides electrical coupling for each of the light tubes while at the same time providing for electrical communication between the ends of panel 12a for providing power to an adjacent panel connected to one end of the panel 12a.

FIG. 12 shows a representative circuit diagram for one of the light tubes which has eight lights therein such that four wires are used at the outlet side in conjunction with a common, which has been shown in FIG. 11.

FIG. 13 shows the male floor panel coupling 18 which includes the male member 18a which is received into the female coupling member 20 for mechanically coupling the adjacent panels together. In addition, the female electrical connector shown in phantom with its respective female conductive apertures 18a which are aligned to be joined to male electrical connector 26. Note that the wall portion 28 is cut away to allow insertion therethrough of male connector 26 while the male portion 18A of mechanical connector 18 must also be cut away to allow mounting of the female electrical connector 24.

FIG. 14 shows a typical floor installation which is cut away to show the floor panels 12 and 12b in a typical floor installation without the illumination members or wiring.

Figure 15:
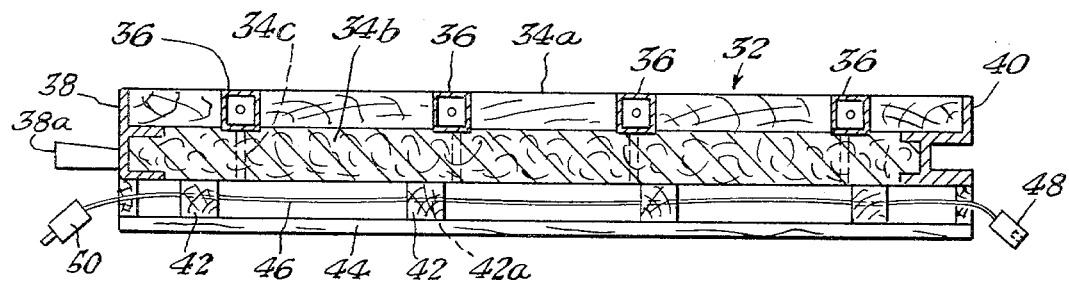
FIG. 15 shows a floor panel of an alternate embodiment of the present invention in a side elevational view in cross-section in which each panel is supported above a permanent surface.
Figure 16:
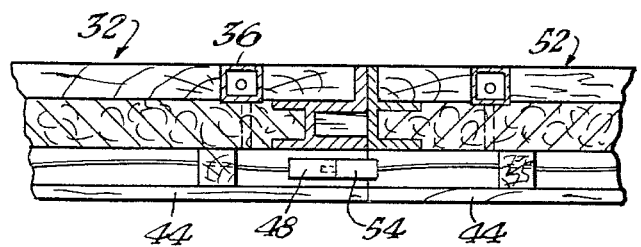
FIG. 16 shows a fragmentary side elevational view in cross-section showing the edge connection of two adjacent panels in accordance with an alternate embodiment of the present invention.

FIGS. 15 and 16 show an alternate embodiment of the present invention. FIG. 15 shows a single panel 32 having conventional mechanical coupling members 38 and 40 along opposite edges coupling member 38 being a male member having a tongue 38a for engagement into a corresponding female element in an adjacent panel. The upper surface of panel 32 includes a portion 34a which has light strips 36 embedded therein as previously discussed. The lower portion 34b includes passages 34c which allow wiring from the light strip 36 to pass through the lower panel 34b. Each panel 32 includes a plurality of supporting strips 42 which support the panel 32 above a permanent floor or permanent surface 44 upon which the portable floor is mounted. Passing through the space formed between the panel and the permanent floor 44 is electrical wiring 46 having an electrical receptacle 48 at one end, and a plug 50 at the opposite end which are used to electrically interconnect adjacent panels. FIG. 16 shows a coupling of two such panels along one side edge such that the mechanical coupling per se is conventional. However, panel 52 which is coupled to panel 32 in the example shown in FIG. 16 is electrically connected between each panel by receptacle 48 connected to a male plug 54. The light strips 36 and the wiring eminating therefrom are electrically connected to the power source through the distribution circuitry 46 as shown, also in a column or row array depending upon the distribution pattern. Along one edge of the finished floor a buss line would connect each of the distribution lines disposed beneath columns or rows of panels to a low voltage source.

Referring back to FIGS. 1 and 2, when considering the wiring from one end of each light tube 16 (5 wires from each tube) and separate wiring between opposite electrical connectors on any one panel, the wires are disposed in grooves cut along the bottom of panel 12b as required by the geometrical configuration. Groove 12d extending from one end of a panel to another is for connecting opposing electrical connectors to link adjacent panels in a row. This groove is covered after the wires are installed. Groove 12e receives the wires from the light strips 16, which all go to only one electrical connector on each panel. Apertures 12f (FIG. 2) allow the wires from each light strip 16 to pass through panel layer 12b to an appropriate groove. All wiring grooves in the lower surface of layer 12b are covered during fabrication of each panel.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. An illuminated portable dance floor for use in conjunction with light energizing apparatus comprising:
   a plurality of interlocking floor sections having top and bottom surfaces and means for coupling said sections together to create a continuous floor surface of adjacent sections,
   at least one illuminated segment embedded in any one of said sections, light from said segments being visible from said top surface,
   each section including electrical connecting means for supplying power to said segments in that section and for supplying power to at least one adjacent section, and
   said connecting means being located to engage like means on adjacent sections simultaneously with the joining of said coupling means.

2. An illuminated portable surface assembly comprising:
   at least one flat panel, each having a top surface, a bottom surface and at least one edge,
   said panel also having at least one impact-resistant electrical illuminating element, each said illuminating element having at least one exposed flat surface portion,
   said illuminating element disposed in said panel top surface, with said illuminating element flat portion flush with said panel top surface,
   at least one of each said panel edges having a mechanical connection means and an electrical connection means,
   said mechanical connection means including complimentary male coupling projection means and female coupling receiving means,
   each said mechanical female coupling element having a contacting means for retaining said mechanical male coupling projection means,
   said electrical connection means including complimentary male electrical connector means and female electrical connector means,
   said panels arrangeable in an edge-to-edge manner with said mechanical male coupling projection means of one said panel edge disposed in said mechanical female coupling receiving means of an adjacent said panel edge and said male electrical connector means of one said panel edge electrically connected to said female electrical connector means of an adjacent panel edge,
   said electrical connection means of each said panel electrically connected to said illuminating elements disposed in said same panel top surface,
   an electrical buss means having a said mechanical connection means, a said electrical connector means for mating with a said panel edge, and at least one externally accessible electrical terminal means for connecting said illuminating elements to an external control and power source.

3. An illuminated portable surface assembly as defined in claim 2 wherein:
   each said flat panel is rectangular with said mechanical connection means and electrical connection means on one said panel edge and the said complimentary mechanical connection means and electrical connection means on the opposite said panel edge, and circuit means connecting said opposing electrical connecting means.

4. An illuminated portable surface assembly as defined in claim 3 wherein:
   the electrical continuity between said illuminating elements and said electrical connection means is contained in an unexposed cavity disposed in said panel.

5. An illuminated portable surface assembly as defined in claim 4 wherein:
   a plurality of said illuminating elements are disposed in each said panel top surface in a design pattern,
   each said illuminating element having a plurality of individually illuminable segments,
   a plurality of said panels are arrangeable in rows of mechanically and electrically connected panels in an edge-to-edge manner forming an overall surface design pattern,
   the excitation sequence of said individually illuminable segment in each panel row is controllable by said external control and power source through said electrical buss means connected at the end of said panel row.

* * * * *

UNITED STATES PATENT AND TRADEMARK OFFICE
CERTIFICATE OF CORRECTION

PATENT NO. : 4,340,929
DATED : July 20, 1982
INVENTOR(S) : Robert S. K. Konikoff, et al.

It is certified that error appears in the above—identified patent and that said Letters Patent is hereby corrected as shown below:

Column 2, line 19, "bulbs of" should be --bulbs or--;

Column 2, line 51, delete "bus", insert --buss--;

Column 5, line 27, delete "28", insert "18"; and

Column 6, line 29, delete "18A", insert "18a";

Signed and Sealed this

Twenty-first Day of June 1983

[SEAL]

Attest:

DONALD J. QUIGG

Attesting Officer

Acting Commissioner of Patents and Trademarks